United States Patent [19]
Ban et al.

[11] Patent Number: 5,708,319
[45] Date of Patent: Jan. 13, 1998

[54] MULTIPLE AXES DRIVE APPARATUS WITH ELECTROSTATIC DRIVE MEANS

[75] Inventors: Takashi Ban; Takahisa Ban; Akira Imura, all of Kariya; Toshiro Higuchi, 3-4-26, Edahigashi, Tuzuki-ku, Yokohama-shi, Kanagawa-ken 224, all of Japan

[73] Assignees: Kabushiki Kaisha Toyoda Jidoshokki Seisakusho, Kariya; Toshiro Higuchi, Yokohama, both of Japan

[21] Appl. No.: 618,872

[22] Filed: Mar. 20, 1996

[30] Foreign Application Priority Data

Mar. 23, 1995 [JP] Japan ................. 7-064548

[51] Int. Cl.⁶ .................. H02K 41/02; H02N 1/00
[52] U.S. Cl. ........................... 310/309; 310/12
[58] Field of Search .................... 310/12, 309

[56] References Cited

U.S. PATENT DOCUMENTS

| | | | |
|---|---|---|---|
| 4,754,185 | 6/1988 | Gabriel et al. | 310/309 |
| 5,055,731 | 10/1991 | Nihei et al. | 310/309 |
| 5,239,222 | 8/1993 | Higuchi et al. | 310/309 |
| 5,378,954 | 1/1995 | Higuchi et al. | 310/309 |
| 5,536,988 | 7/1996 | Zhang et al. | 310/309 |

FOREIGN PATENT DOCUMENTS

| | | |
|---|---|---|
| 2285978 | 11/1990 | Japan. |
| 475483 | 3/1992 | Japan. |

*Primary Examiner*—Clayton E. LaBalle
*Attorney, Agent, or Firm*—Brooks Haidt Haffner & Delahunty

[57] ABSTRACT

A multiple axes drive apparatus having a plurality of electrostatic actuators for applying driving forces in a plurality of different directions within a plane to a driven member. Each electrostatic actuator of the drive apparatus includes a first member that has a plurality of first electrode strips arranged in a single direction with a predetermined pitch, and a second member that has a plurality of second electrode strips arranged in the same direction as the first electrode strips with the same pitch. The members are located opposite to each other so one of the members moves along the single direction in response to a Coulomb force generated between the electrode strips when voltage is applied to the electrode strips.

13 Claims, 7 Drawing Sheets

MULTIPLE AXES DRIVE APPARATUS WITH ELECTROSTATIC DRIVE MEANS

BACKGROUND OF THE INVENTION

1. Field of the Invention

The present invention relates to a multiple axes drive apparatus that moves a driven member, such as a machine tool table that supports a workpiece, along a number of directions in the same plane to a predetermined position.

2. Description of the Related Art

Figure 9:
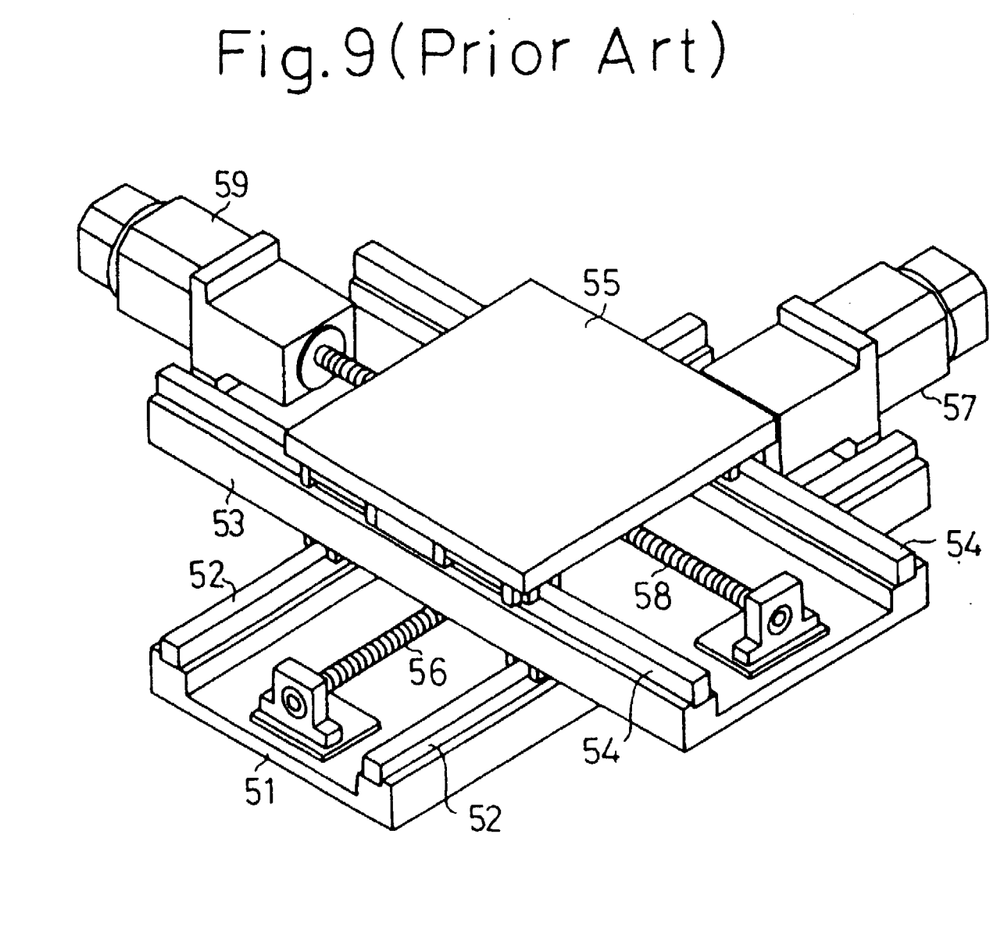
FIG. 9 is a perspective view of a prior art multiple axes drive apparatus.

The structure of a typical prior art multiple axes drive apparatus is shown in FIG. 9. A pair of first rails 52 is provided on the upper surface of a base 51. A saddle 53 is movably supported by the first rails 52. A pair of second rails 54 extending in a direction perpendicular to the first rails 52 is provided on the upper surface of the saddle 53. A driven member, or table 55, is movably supported by the second rails 54. A ball screw 56 is rotatably supported on the base 51 and connected to a first motor 57. A ball screw 58 is rotatably supported on the saddle 53 and connected to a second motor 59.

When the first motor 57 rotates the first ball screw 56, a screw nut (not shown) moves the saddle 53 along the first rails 52. When the second motor 59 rotates the second ball screw 58, a screw nut (not shown) moves the table 55 along the second rails 54. Accordingly, the table 55 is moved freely along two directions in the same plane. This allows the table 55 to be moved to a predetermined position.

However, in this prior art drive apparatus, the motors 57, 59 rotate the ball screws 56, 58 and move the table 55 in two directions. Thus, the drive source, or the bulky motors 57, 59, caused the structure of the entire apparatus to be complicated, large, and heavy.

In addition, since the rotating force of the motors 57, 59 is converted to the driving force of the table 55 by the ball screws 56, 58 and the screw nuts, a large power loss occurs during the force conversion.

SUMMARY OF THE INVENTION

It is a first objective of the present invention to provide a multiple axes drive apparatus having a simplified structure that reduces the size and weight of the entire apparatus.

It is a second objective of the present invention to provide a multiple axes drive apparatus capable of moving a driven member to a predetermined position simply and accurately with low power loss.

To achieve the above objectives, a multiple axes drive apparatus having a plurality of electrostatic actuators for applying driving forces in a plurality of different coplanar directions to a driven member is provided. Each electrostatic actuator of the drive apparatus includes a first member that has a plurality of first electrode strips arranged in a single direction with a predetermined pitch, and a second member that has a plurality of second electrode strips arranged with the predetermined pitch in the same direction as the first electrode strips. The first and second members are located opposite to each other so that one of the first and second member moves along the single direction in response to a Coulomb force generated between the first and second electrode strips when voltage is applied to the first and second electrode strips.

Accordingly, the Coulomb force generated between the first and second electrode strips moves either one of the first and second members in the arranging direction of the electrode strips. Since the electrostatic actuator produces driving forces of different directions, a plurality of forces in different directions are applied to the driven member on the same plane. Therefore, the operation of the electrostatic actuators, moves the driven member in a number of directions in a single plane.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIGS. 4 (a), (b), and (c) are explanatory diagrams respectively showing first, second, and third control signals transmitted from a DSP;

FIGS. 6 (a), (b), (c), and (d) are explanatory diagrams showing the operation of a third embodiment of the multiple axes drive apparatus;

DETAILED DESCRIPTION OF THE PREFERRED EMBODIMENTS

Figure 1:
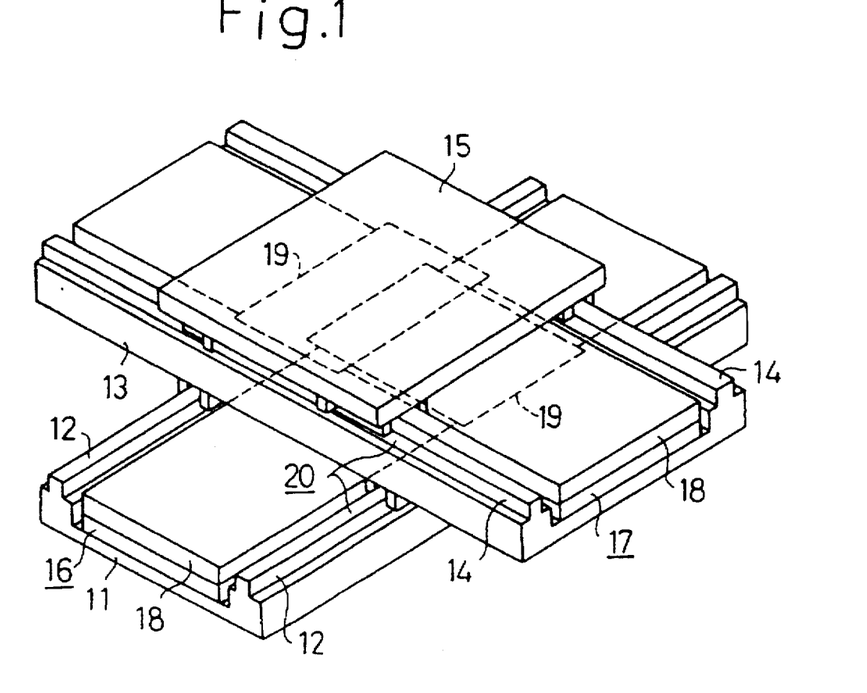
FIG. 1 is a perspective view showing a first embodiment of a multiple axes drive apparatus according to the present invention.

A first embodiment of the present invention will now be described with reference to FIGS. 1 to 4. As shown in FIG. 1, a pair of parallel first rails 12 is provided on the upper surface of a fixed member, or base 11. A saddle 13 is movably supported by the first rails 12. A pair of parallel second rails 14, extending in a direction perpendicular to the first rails 12, is provided on the upper surface of the saddle 13. A driven member, or table 15, is movably supported by the second rails 14.

A first electrostatic actuator 16 is arranged between the base 11 and the saddle 13. The first actuator 16 moves the saddle 13 along the first rails 12. A second electrostatic actuator 17 is arranged between the saddle 13 and the table 15. The second actuator 17 moves the table 15 along the second rails 14. Activation of the actuators 16, 17, which are arranged one above the other, moves the table 15 along two perpendicular directions to a predetermined position.

Figure 2:
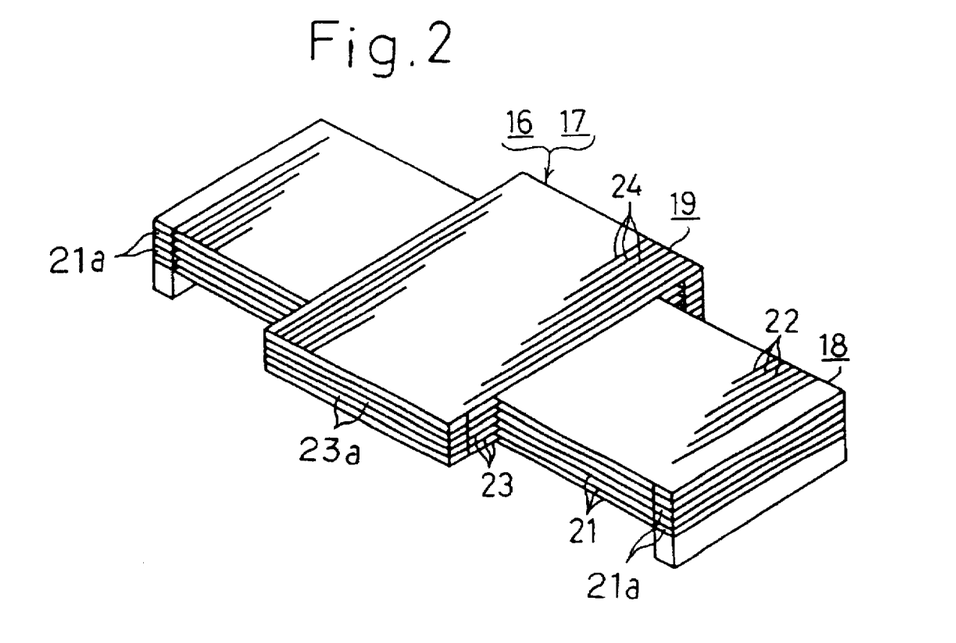
FIG. 2 is a perspective view showing an electrostatic actuator of the apparatus of FIG. 1.

As shown in FIGS. 1 and 2, each actuator 16, 17 includes a fixed element, or first member 18, and a movable element, or second member 19. The second member 19 is mounted on and is relatively movable to the first member 18. The first member 18 of the first actuator 16 is secured to the upper surface of the base 11. The second member 19 of the actuator 16 is secured to the lower surface of the saddle 13. The first member 18 of the second actuator 17 is secured to the upper surface of the saddle 13. The second member 19 of the actuator 17 is secured to the lower surface of the table 15.

In other words, the first member 18 of the stationary first actuator 16 is fixed onto the base 11. The movable second actuator 17 is supported above the second member 19 of the first actuator 16 by the saddle 13. The table 15 is fixed on the second member 19 of the second actuator 17. In this embodiment, the first and second rails 12, 14 constitute a mechanism 20 that prevents the table 15 from rotating.

Figure 3:
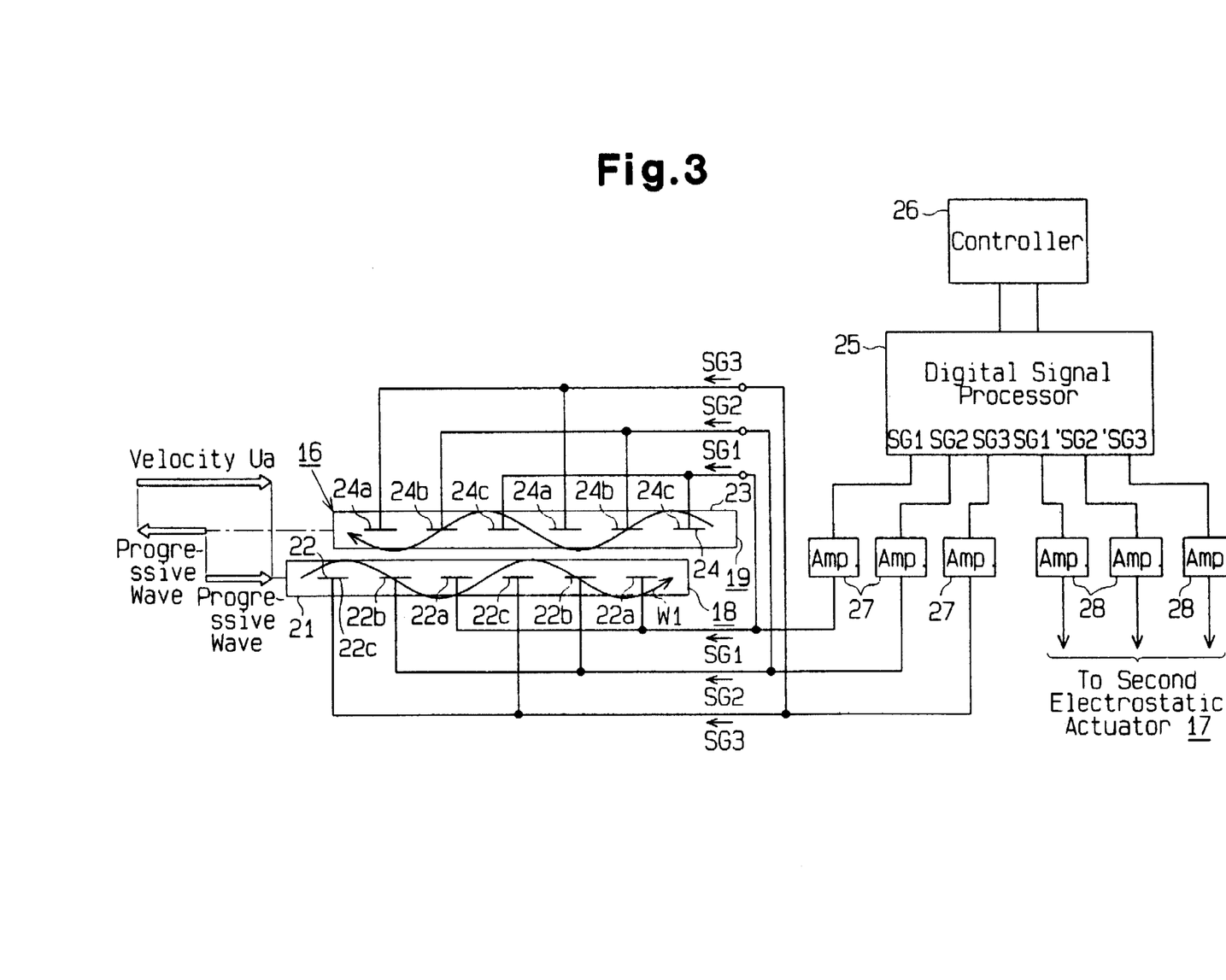
FIG. 3 is a block diagram showing a control circuit for actuation of the apparatus of FIG. 1.

As shown in FIGS. 2 and 3, the first member 18 of each actuator 16, 17 includes a plurality of sheets 21, which are made of an insulating material and laminated with spacers 21a defining a predetermined space between each sheet 21. Each sheet 21 has a plurality of electrode strips 22 arranged in the same direction with a predetermined pitch between each other. The second member 19 also includes a plurality of sheets 23, which are made of an insulating material and laminated with spacers 23a defining a predetermined space between each sheet 23. Each sheet 23 has a plurality of electrode strips 24 arranged in the same direction as the electrode strips 22 of the first member 18 with a predetermined pitch defined between each other. Each sheet 21 of the first member 18 is arranged alternately with and opposed to each sheet 23 of the second member 19.

Figure 4A:
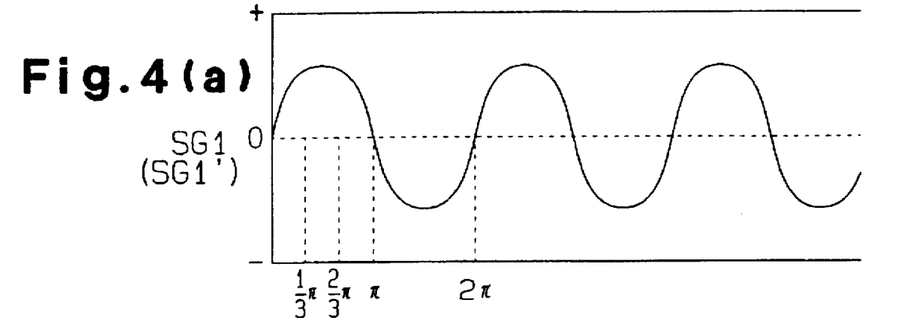
Figure 4B:
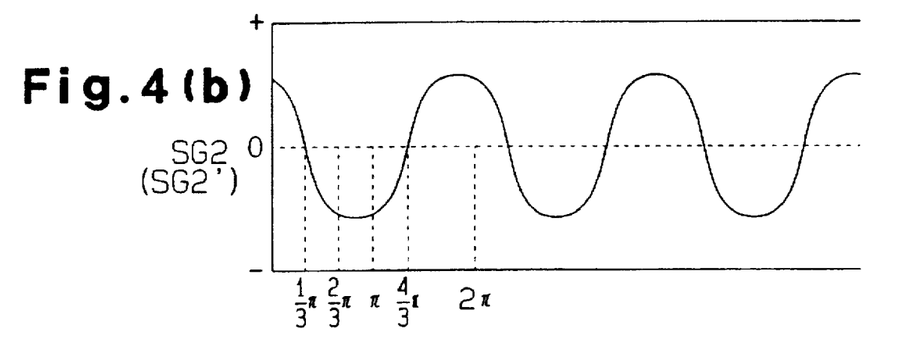
Figure 4C:
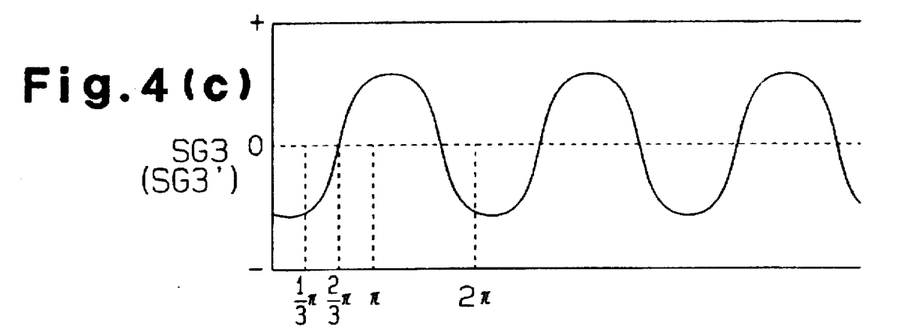

As shown in FIGS. 3 and 4, a digital signal processor (DSP) 25, equipped with a digital-to-analog (D/A) convertor (not shown), is connected to the electrode strips 22, 24 of the members 18, 19 of each actuator 16, 17. The DSP 25 transmits a first control signal SG1, a second control signal SG2, and a third control signal SG3, as shown in FIGS. 4 (a), 4 (b), and 4 (c), to the actuator 16 in response to a controller 26. The DSP 25 also transmits a first control signal SG1', a second control signal SG2', and a third control signal SG3', as shown in FIGS. 4 (a), 4 (b), and 4 (c), to the actuator 17 in response to the controller 26. As apparent from these drawings, the signals SG1, SG2, SG3 and SG1', SG2', SG3' are voltage signals that have phases offset from one another by $2\pi/3$. Thus, the signals SG1, SG2, SG3 and SG1', SG2', SG3' constitute a three-phase alternating voltage signal.

As shown in FIG. 3, the electrode strips 22 and 24 are categorized into three electrode groups consisting of first electrodes 22a, 24a, second electrodes 22b, 24b, and third electrodes 22c, 24c. The electrodes 22a, 22b, 22c and 24a, 24b, 24c of each group are arranged in sequence. In both actuators 16, 17, the arranging order of the electrodes 22a, 22b, 22c provided in the first member 18 is reversed with respect to the arranging order of the electrodes 24a, 24b, 24c provided in the second member 19.

The DSP 25 produces the first, second, and third signals SG1, SG2, SG3 and SG1', SG2', SG3' through predetermined signal processing and D/A converting of the digital signals sent from the controller 26. These digital signals are amplified by amplifiers 27, 28 and then applied to the electrodes 22a, 22b, 22c and 24a, 24b, 24c.

It is known that when the first, second, and third signals SG1, SG2, SG3 and SG1', SG2', SG3' are applied to the electrode strips 22, 24 of the first and second members 18, 19 in the above manner, electric potential progressive waves W1, W2, which have a predetermined wavelength, are generated in the members 18, 19, respectively. However, since the arranging order of the electrodes 22a, 22b, 22c are reversed with respect to the arranging order of the electrodes 24a, 24b, 24c, the direction of the wave W1 on the member 18 and the direction of the wave W2 on the member 19 are also reversed from each other, as shown by the arrows in FIG. 3.

The two progressive waves W1, W2 having offset phases generate a Coulomb force between the electrode strip 22 of the first member 18 and the electrode strip 24 of the second member 19 from static electricity. The Coulomb force moves the second member 19 relative to the first member 18 along the arranged direction of the electrode strips 22, 24 (rightward direction in FIG. 3). In this case, the progressive wave W1 velocity of the first member 18 and the progressive wave W2 velocity of the second member 19 are the same while their directions are opposite. Hence, the velocity Ua of the second member 19 is two times faster than the velocity of the waves W1, W2.

When the second member 19 is moved relative to the first member 18 along the arranging direction of the electrode strips 22, 24 in the stationary first actuator 16, the movable actuator 17 on the saddle 13 is also moved in the same direction. The second member 19 of the movable second actuator 17 is moved in a direction perpendicular to the moving direction of the actuator 17. This allows the table 15 on the second member 19 of the second actuator 17 to be moved freely in two perpendicular directions.

Target positions and the velocity of the table 15 are input into the controller 26 by an inputting device (not shown). The controller 26 controls the DSP 25 based on the input data and alters the frequency and waveform of the signals SG1, SG2, SG3 and SG1', SG2', SG3' which are sent to the actuators 16, 17.

The operation of the multiple axes drive apparatus is as follows. The signals SG1, SG2, SG3 and SG1', SG2', SG3' are applied to the electrode strips 22, 24 of the actuators 16, 17, respectively, by the DSP 25 in response to the controller 26. This generates a Coulomb force between the electrode strips 22 of the first member 18 and the electrode strips 24 of the second member 19. The Coulomb force applies driving force to the second members along the arranging direction of the electrode strips 22, 24. The driving force applied in two perpendicular directions enables the table 15 to be moved in two directions to a predetermined position.

During positioning of the table 15, the rotation preventing mechanism 20 restricts movement of the second member 19 of each actuator 16, 17 to directions that are perpendicular to each other. This prevents each second member 19 from rotating relative to the associated first member 18. Hence, rotation of the table 15 in its moving plane is prevented.

As described above, the driven member, or table 15, is moved in the same plane by applying driving force in two different directions with the two actuators 16, 17. Therefore, in comparison with the prior art multiple axes drive apparatus having motors and ball screws, the structure is simplified. This allows the entire apparatus to be more compact and light.

In the multiple axes drive apparatus according to the present invention, the actuators 16, 17 directly move the driven member, or table 15. Thus, the power loss is small in comparison with the prior art drive apparatuses that convert the rotation of a motor to a linear driving force through ball screws and screw nuts. Accordingly, the table 15 may easily and accurately be moved to a predetermined position.

Furthermore, in this embodiment, the first and second members 18, 19 of the actuators 16, 17 are made of laminated sheets 21, 23, which are made of an insulating material. This enables the actuators 16, 17 to have a large driving force despite their compact size and light weight. The strength of the driving force may also be adjusted according to its purposes by simply changing the number of laminated sheets 21, 23. In addition, when a large number of sheets 21, 23 are laminated to obtain a strong driving force, the thickness of the sheets 21, 23 being thin, prevents the actuators 16, 17 from becoming large or heavy.

Figure 5:
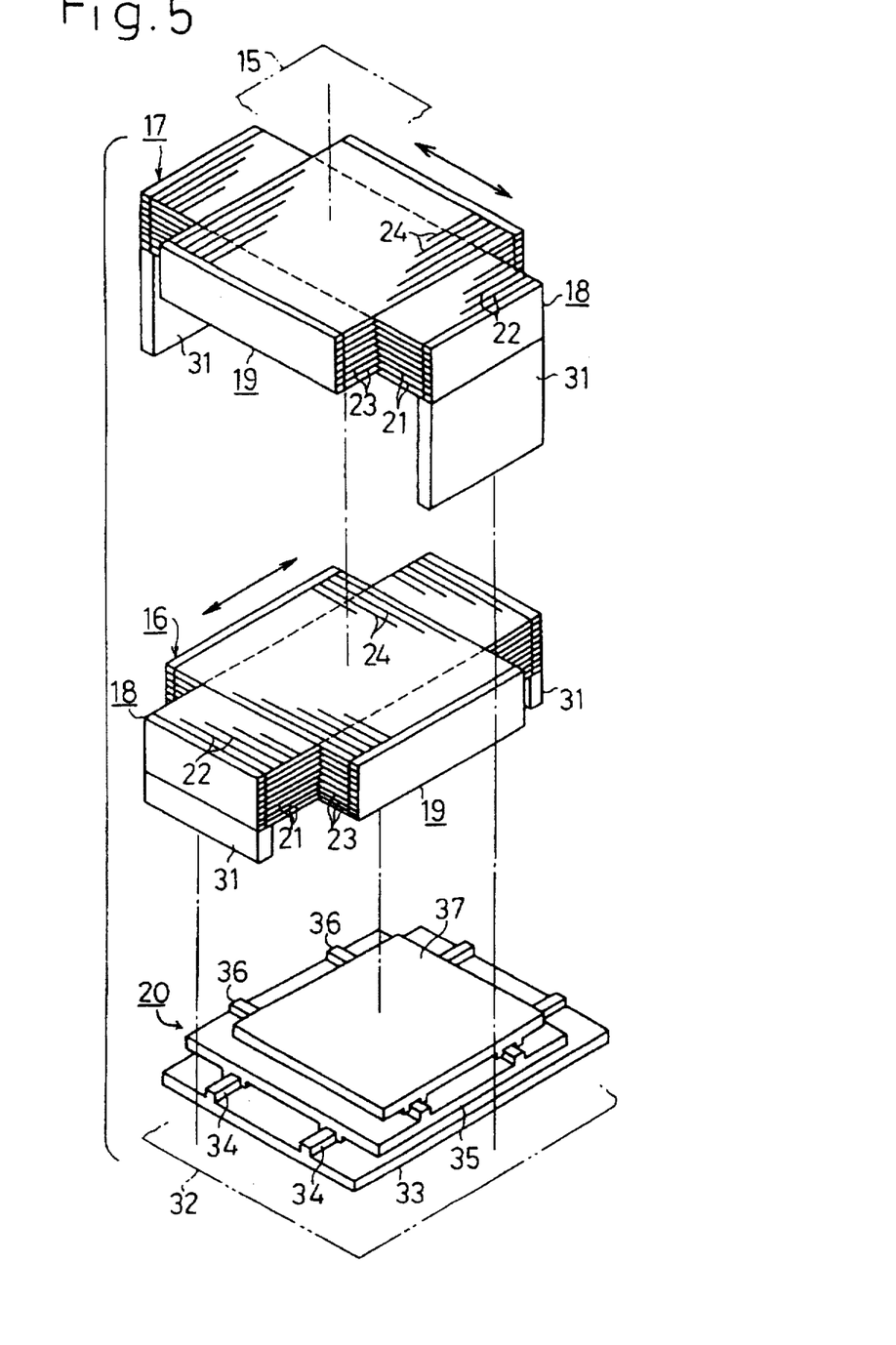
FIG. 5 is an exploded perspective view showing the main section of a second embodiment of the multiple axes drive apparatus.
Figure 6A:
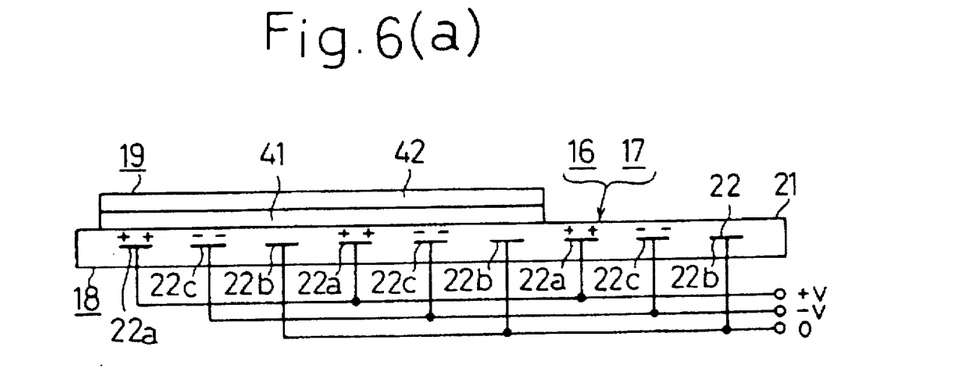
Figure 6B:
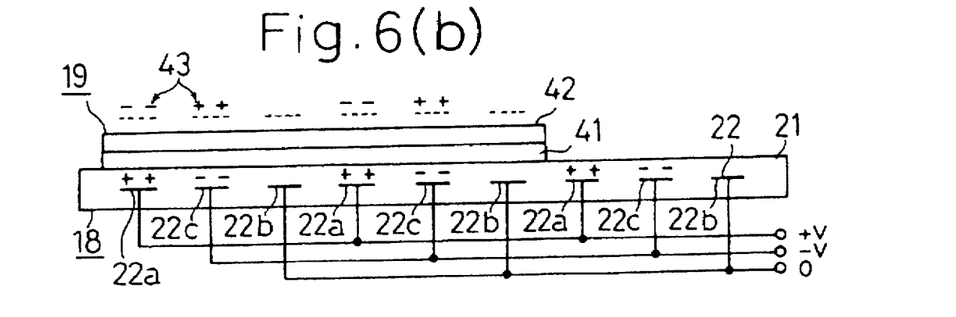
Figure 6C:
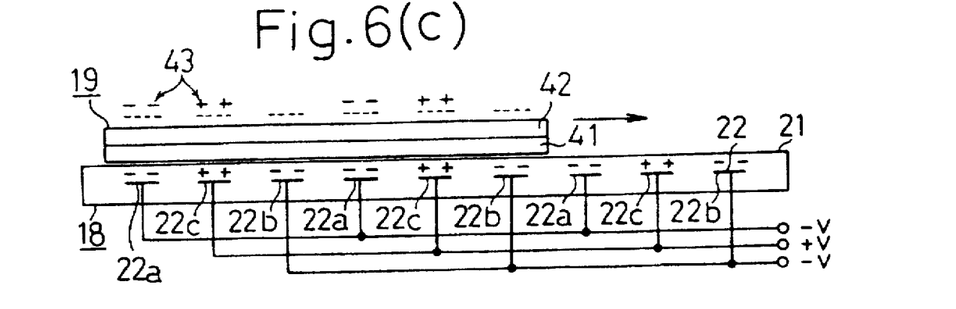
Figure 6D:
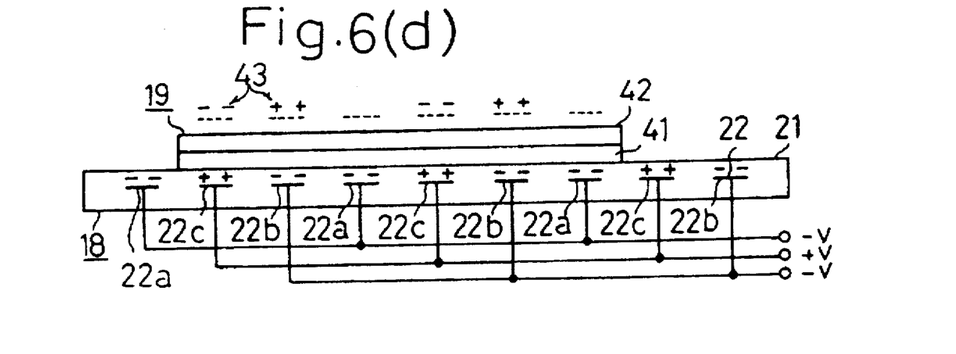

A second embodiment according to the present invention will now be described with reference to FIG. 5. In this embodiment, the rotation preventing mechanism 20 and the assembled manner of the actuators 16, 17 differ from the first embodiment. That is, in the second embodiment, the rotation preventing mechanism 20 is constituted from only one unit. The mechanism 20 prevents rotation of the second member 19 in each actuator 16, 17. This, in turn, prevents rotation of the rotation of the driven member, or table 15.

More specifically, the first members 18 of the two actuators 16, 17 are arranged in a manner such that their electrode strips 22 are opposed to each other extending in perpendicular directions. In this state, both ends of the two first members 18 are fastened to a fixed member, or base plate 32, by fastening blocks 31. The second members 19 of the two actuators 16, 17 are connected opposed to each other in a manner such that they are arranged extending in perpendicular directions. The driven member, or table 15, is fastened onto the uppermost surface of the connected second members 19.

A driving force in the arranging direction of the electrode strips 22, 24 is applied to the movable second members 19 with respect to the stationary first members 18. However, driving forces in directions perpendicular to the electrode strips 22, 24, i.e., extending direction of the strips 22, 24, are not applied. To enable the second members 19 to be movable with respect to the first members 18 not only in the arranging direction of the electrode strips 22, 24 but also in their extending directions, the length of each strip 22, 24 is set at a value larger than the width of the first member 18. Thus, when a driving force is applied to one of the second members 19 with the two movable second members 19 connected to each other in a manner such that their electrode strips 24 are perpendicular to each other, interference in the movement of the other second member 19 in the direction of the applied force is prevented. Thus, the table 15 secured to the second member 19 is movable in two different directions.

The rotation preventing mechanism 20 has a support plate 33 secured on the base plate 32. A pair of first rails 34, extending along the arranging direction of the electrode strips 22, 24 of the first actuator 16, is provided on the upper surface of the support plate 33. A first restricting plate 35 is movably supported by the first rails 34. A pair of second rails 36, extending along the arranging direction of the electrode strips 22, 24 of the second actuator 17, is provided on the upper surface of the first restricting plate 35. A second restricting plate 37 is movably supported by the second rails 36. The second members 19 of both actuators 16, 17 are secured to the upper surface of the second restricting plate 37.

There is a possibility that the stationary first members 18 may rotate relatively to the movable first members 18 and thus cause rotation of the table 15 when the moving direction of the two second members 19 is not restricted with respect to the first members 18. However, in the drive apparatus of the second embodiment, the movement of each movable second member 19 is restricted by the two restricting plates 35, 37 of the mechanism 20. This ensures prevention of table 15 rotation. Furthermore, the same advantageous effects of the first embodiment are also obtained in this embodiment.

A third embodiment according to the present invention will now be described with reference to FIGS. 6 (a), (b), (c), and (d). In this embodiment, the structure of the second member 19 of each actuator 16, 17 differs from the first embodiment. That is, the second members 19 include sheets 41, made of an insulating material, and resistance layers 42 formed on the surface of each sheet 41. FIGS. 6 (a), (b), (c), and (d) show only a single set of adjacent first and second members 19. As shown in the drawings of FIG. 6, the stationary first member 18 has a plurality of electrode strips 22 in each sheet 21 with a predetermined pitch defined between each of the strips 22 as in the first embodiment.

In the actuators 16, 17 of the third embodiment, voltage having a value of +V, 0, −V (v) is respectively applied to the first, second, and third electrodes 22a, 22b, 22c of each first member 18, as shown in FIG. 6 (a). This generates an induced electric charge 43, the polarity of which is opposite to the electric charge of the associated electrode 22 at the position shown diagrammatically by the dotted lines in FIG. 6 (b).

The electric potential of each electrode 22 immediately changes when the state of the voltage applied to the electrode strips 22 of the first member 18 is altered, as shown in FIG. 6 (c). However, the high resistance value of the resistance layer 42 prevents the induced electric charge 43 of the second member 43 from being immediately shifted. This produces a repulsion force between electric charges of the same polarity in both members 18, 19 and causes immediate floatation of the second member 19. The induced electric charge 43 of the second member 19 is attracted by the electric charges having different polarities on adjacent electrodes 22.

Consequently, as shown in FIG. 6 (d), the second member 19 is moved over a distance equal to a single pitch of the electrode strips 22 and is positioned on the first member 18. Repetition of the steps shown in FIGS. 6 (a) to (d) moves the second member 19 along the surface of the first member 18 in the arranging direction of the electrode strips 22.

By controlling the voltage applied to the first members 18 of the actuators 16, 17, two perpendicular driving forces applied to the table 15 enable the table 15 to be moved in the same plane. Therefore, the advantageous effects of the first embodiment are also obtained in this embodiment.

In the third embodiment, the movable second members 19 are not provided with electrode strips. Hence, voltage is applied only to the first member 18. Since the second member 19 does not require application of voltage, the structure of a device for controlling the actuators 16, 17 is simplified.

Other embodiments according to the present invention will be described with reference to FIGS. 7 and 8. The drive apparatus shown in FIG. 7 employs three overlapped actuators 46, 47, 48 instead of the two actuators employed in the first and second embodiments. These actuators 46, 47, 48 enable application of driving forces in three directions. The three directions intersect with one another on the same plane at an angle, which is approximately sixty degrees.

Figure 8:
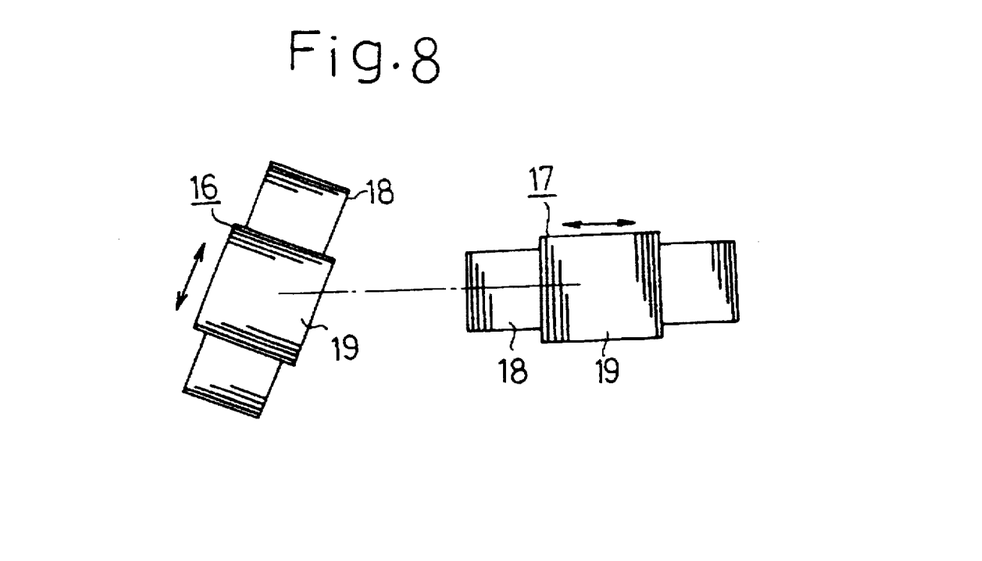
FIG. 8 is an exploded top plan view showing another embodiment of the multiple axes drive apparatus.

In the embodiment shown in FIG. 8, the two overlapping actuators 16, 17 differ from those of the first and second embodiments in that their second members 19 move in directions that are not perpendicular to each other. Thus, actuators 16, 17 apply driving forces to the table 15 in two different directions, which intersect with each other at a predetermined angle. In this case, the same advantageous effects as the first and second embodiments are obtained.

It should be apparent to those skilled in the art that the present invention may be embodied in many other specific forms without departing from the spirit or scope of the invention. Particularly, it should be understood that the present invention may also be modified as described below.

(1) Four or more electrostatic actuators may be employed. In this case, actuators apply driving forces to the driven member in more than four directions in the same plane.

(2) In the third embodiment shown in FIG. 6, the electrostatic actuators 16, 17 may be constituted with the second member 19, including the resistance layers 42, being stationary and the first member 18, including the electrode strips 22, being movable.

Figure 7:
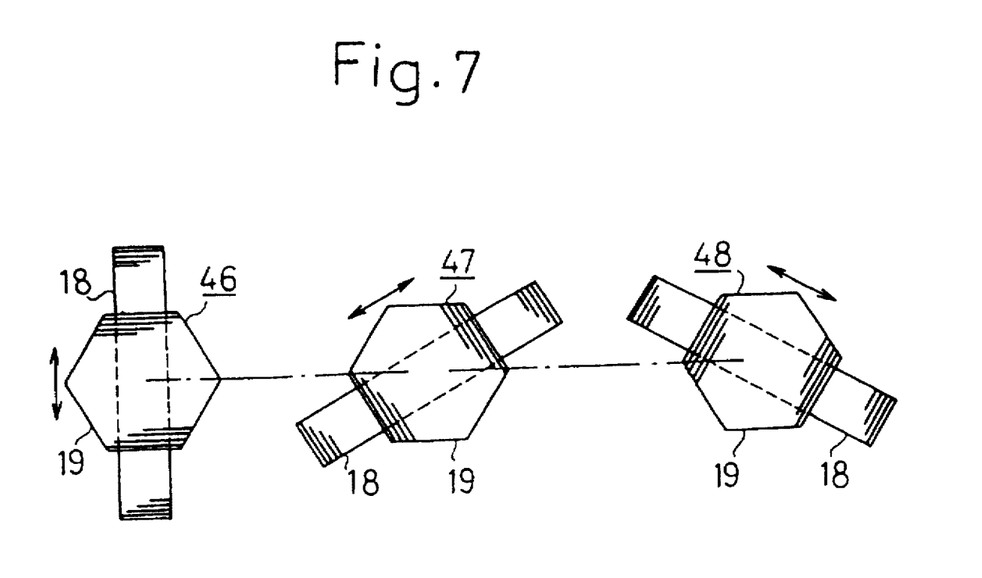
FIG. 7 is an exploded top plan view showing another embodiment of the multiple axes drive apparatus.

(3) The embodiments shown in FIGS. 7 and 8 may be combined with the third embodiment shown in FIG. 6.

(4) In each of the above embodiments, a voltage signal having a rectangular wave may be employed in lieu of the three-phase alternating voltage signal.

Therefore, the present examples and embodiments are to be considered as illustrative and not restrictive and the invention is not to be limited to the details given herein, but may be modified within the scope of the appended claims.

What is claimed is:

1. A multiple axes drive apparatus having a plurality of electrostatic actuators for applying driving forces in a plurality of different coplanar directions to a driven member, said plurality of electrostatic actuators being stacked and operably interconnected, each electrostatic actuator of said drive apparatus comprising:

a first member comprising a plurality of parallel spaced apart first sheets;

a second member comprising a plurality of parallel spaced apart second sheets disposed interleaved between said first sheets, the spacing and mounting of said first and second sheets being such as to permit said first and second members to move relative to each other in a predetermined direction;

said first sheets each having a plurality of first parallel electrode strips disposed at a predetermined inter-strip pitch oriented perpendicular to said predetermined direction, said second sheets each having a plurality of second parallel electrode strips disposed at said predetermined inter-strip pitch oriented perpendicular to said predetermined direction, said first and second members being relatively movable in said predetermined direction in response to a Coulomb force generated between said first and second electrode strips when voltage is applied to said first and second electrode strips.

2. The drive apparatus according to claim 1 further comprising a mechanism for preventing said driven member from rotating about its own axis.

3. The drive apparatus according to claim 2 further comprising:

a fixture member for establishing a stationary one of said first and second members of a lowermost one of said electrostatic actuators, the other of said first and second members of the lowermost electrostatic actuator being movable;

wherein the rest of said electrostatic actuators are supported on the movable one of said first and second members of the lowermost electrostatic actuator; and wherein said driven member is mounted on the movable one of said first and second members of an uppermost one of said electrostatic actuators.

4. The drive apparatus according to claim 2 further comprising:

a fixture member for fixing one of said first and second members of each electrostatic actuator; and wherein the other of said first and second members of each electrostatic actuator is connected to said driven member.

5. The drive apparatus according to claim 2, wherein said plurality of electrostatic actuators include two electrostatic actuators that apply said driving forces in two directions perpendicular to each other to said driven member.

6. The drive apparatus according to claim 2, wherein said plurality of electrostatic actuators include three electrostatic actuators that apply said driving forces in three intersecting directions to said driven member.

7. The drive apparatus according to claim 2, wherein each of said sheets is of laminated made of an insulating material, with said plurality of electrode strips built-in.

8. A multiple axes drive apparatus having a plurality of electrostatic actuators for applying driving forces in a plurality of different directions within a single plane to a driven member, said plurality of electrostatic actuators being stacked and operably interconnected, each electrostatic actuator of said drive apparatus comprising:

a first member comprising a plurality of parallel spaced apart first sheets;

a second member comprising a plurality of parallel spaced apart second sheets disposed interleaved between said first sheets, the spacing and mounting of said first and second sheets being such as to permit said first and second members to move relative to each other in a predetermined direction;

said first sheets each having a plurality of first parallel electrode strips disposed at a predetermined inter-strip pitch oriented perpendicular to said predetermined direction;

said second sheets each having a resistance layer;

said first and second members being relatively movable in said predetermined direction in response to a Coulomb force generated between said first electrode strips and said resistance layers when voltage is applied to said first electrode strips.

9. The drive apparatus according to claim 8, wherein each of said first sheets is laminated made of an insulating material with said plurality of electrode strips built-in.

10. The drive apparatus according to claim 8 further comprising a mechanism for preventing said driven member from rotating about its own axis on said single plane.

11. The drive apparatus according to claim 10 further comprising:

a immobilizing member for fixing one of said first and second members of each electrostatic actuator; and wherein the other of said first and second members of each electrostatic actuator is connected to said driven member.

12. The drive apparatus according to claim 10, wherein said plurality of electrostatic actuators include two electrostatic actuators that apply said driving forces in two directions perpendicular to each other in said single plane to said driven member.

13. The drive apparatus according to claim 10, wherein said plurality of electrostatic actuators include three electrostatic actuators that apply said driving forces in three intersecting directions in said single plane to said driven member.

* * * * *

UNITED STATES PATENT AND TRADEMARK OFFICE
CERTIFICATE OF CORRECTION

PATENT NO. : 5,708,319
DATED : January 13, 1998
INVENTOR(S) : Ban et al

It is certified that error appears in the above-indentified patent and that said Letters Patent is hereby corrected as shown below:

Col. 8, 12, after "material" delete the comma (,);

Col. 8, line 46, change "immobilizing" to --fixture--; and change "fixing" to --immobilizing--.

Signed and Sealed this

Fifth Day of May, 1998

Attest:

BRUCE LEHMAN

Attesting Officer

Commissioner of Patents and Trademarks